United States Patent
Koo et al.

(10) Patent No.: US 12,409,730 B2
(45) Date of Patent: Sep. 9, 2025

(54) SAFETY SUPPORT SYSTEM FOR ASSISTING SAFETY OF OBJECTS AROUND VEHICLE

(71) Applicant: MABA INDUSTRIAL CO., LTD, Ulsan (KR)

(72) Inventors: Hyo Jeong Koo, Seoul (KR); Yong Hwan Choi, Wanju gun (KR)

(73) Assignee: MABA INDUSTRIAL CO., LTD, Ulsan (KR)

( * ) Notice: Subject to any disclaimer, the term of this patent is extended or adjusted under 35 U.S.C. 154(b) by 0 days.

(21) Appl. No.: 18/810,051

(22) Filed: Aug. 20, 2024

(65) Prior Publication Data
US 2025/0145002 A1    May 8, 2025

(51) Int. Cl.
*B60K 35/233* (2024.01)
*B60K 35/231* (2024.01)
*B60K 35/232* (2024.01)
*G06V 20/58* (2022.01)

(52) U.S. Cl.
CPC .......... *B60K 35/233* (2024.01); *B60K 35/231* (2024.01); *B60K 35/232* (2024.01); *G06V 20/58* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 11,926,344 B1* | 3/2024 | Roy | G08G 1/04 |
| 2019/0106050 A1* | 4/2019 | Kamhi | B60Q 1/247 |
| 2019/0196482 A1* | 6/2019 | Reiley | G05D 1/0214 |
| 2021/0171060 A1* | 6/2021 | Mimura | B60Q 1/549 |

FOREIGN PATENT DOCUMENTS

| | | | |
|---|---|---|---|
| KR | 101772444 B1 | 8/2017 | |
| KR | 101908422 B1 | 10/2018 | |
| KR | 20210052621 A | 5/2021 | |
| WO | 2016163294 A1 | 10/2016 | |

OTHER PUBLICATIONS

Ayda Ayoubi, The Future of Pedestrian Crossing, Oct. 12, 2017, Architect, https://www.architectmagazine.com/technology/the-future-of-pedestrian-crossing_o (Year: 2017).*

* cited by examiner

*Primary Examiner* — James J Lee
*Assistant Examiner* — Andrew Sang Kim
(74) *Attorney, Agent, or Firm* — AEON Law, PLLC; Adam L. K. Philipp; Ki Yong O

(57) ABSTRACT

A vehicle safety support system is provided. The vehicle safety support system according to some embodiments of the present disclosure can track and display the location of the object related to the vehicle, thereby assisting objects surrounding the vehicle to recognize the object related to the vehicle. Accordingly, it is possible to support the object related to the vehicle to safely get on and off the vehicle. Further, the vehicle safety support system according to some embodiments of the present disclosure can support the objects around the vehicle to perform safe passage or safe driving by providing various types of information related to the vehicle through an external display.

9 Claims, 16 Drawing Sheets

(a)

(b)

SAFETY SUPPORT SYSTEM FOR ASSISTING SAFETY OF OBJECTS AROUND VEHICLE

CROSS-REFERENCE TO RELATED APPLICATION

This application claims priority under 35 U.S.C § 119 to Korean Patent Application No. 10-2023-0150818 filed on Nov. 3, 2023, in the Korean Intellectual Property Office, the entire contents of which are hereby incorporated by reference.

TECHNICAL FIELD

The disclosure relates to a safety support system capable of assisting the safety of objects around a vehicle. Particularly, the disclosure relates to a safety support system, which can support a subject related to a vehicle to safely get on and off the vehicle, and can assist the safety of objects around the vehicle by providing various types of information related to the vehicle to surrounding vehicles or road users.

Explanation on state-supported research and development. This study was conducted under the management of the Korea Evaluation Institute of Industrial Technology and with the support of the "Development of Multipurpose Mobility (PVB) Cabin Design Technology" (Project Identification Number: 1415181143) of the Design Industry Technology Development Project of the Ministry of Trade, Industry and Energy.

BACKGROUND

The contents set forth in this section merely provide background information on the present embodiments and do not constitute prior art.

With the fourth industrial revolution, the conceptual change, in particular, the conceptual change from "owning" a vehicle to "using" or "sharing" a vehicle, is occurring, and related markets and related services are experiencing explosive growth.

In particular, since a plurality of users can use vehicles shared for various purposes, development of a purpose built vehicle (hereinafter, "PBV") for satisfying various changes in mobility purpose and user's various needs has been actively underway.

For the purpose built vehicle, displays having various types and features (PDLC, flexible display, transparent display, and projector) may be disposed inside and outside a vehicle. The purpose built vehicle may be controlled to provide more various pieces of information in accordance with the purpose and situation of operation in comparison to the analog type information indication in the related art.

Therefore, the applicant of the disclosure came up to suggest a technology, which can support a subject related to a vehicle to safely get on and off the vehicle through various display devices, and can assist the safety of objects around the vehicle by providing various types of information related to the vehicle to surrounding vehicles or road users.

SUMMARY

An object of the present disclosure is to provide a vehicle safety support system, which can support a subject related to the vehicle to safely get on and off the vehicle, and can assist the safety of objects around the vehicle by providing various types of information related to the vehicle to surrounding vehicles or road users.

The objects of the present disclosure are not limited to the objects mentioned above, and other objects and advantages of the present disclosure that have not been mentioned can be understood by the following description and will be more clearly understood by the embodiments of the present disclosure. Further, it will be readily appreciated that the objects and advantages of the present disclosure may be realized by the means set forth in the claims and combinations thereof.

According to some aspects of the disclosure, a vehicle safety support system comprises, a vehicle, a projector disposed on the vehicle, a sensor configured to generate object identification information by identifying at least one object located around the vehicle and to generate object location information that corresponds to a location of the identified object, and a processor configured to generate a guide image in consideration of the object identification information, wherein the projector is configured to project the guide image on a bottom surface on which the at least one object is located in response to the object location information, wherein the sensor is configured to continuously maintain an object sensing state even after the object is once identified, wherein the sensor is configured to generate object movement information by determining whether the object moves in real time or in near real time, and wherein the projector is configured to make the guide image be continuously located on the bottom surface on which the object is located by adjusting a projection location of the guide image so that the guide image tracks the object in accordance with the object movement information.

According to some aspects, the object identification information comprises size information of the identified object, and wherein the processor is configured to define a protection area of the object in accordance with the size information of the object and to generate the guide image so that a border of the protection area is emphasized.

According to some aspects, the at least one object is in a state of getting off the vehicle, and wherein the sensor is configured to generate the object location information and the object identification information by identifying the object that gets off the vehicle and to be activated in response to opening of a door of the vehicle.

According to some aspects, further comprising an external display disposed in a getting-on/off area of the vehicle, wherein the external display is configured to generate object touch information by recognizing contact with the object, wherein the processor is configured to further generate an assistive guide image in consideration of the object identification information, and wherein the external display is configured to be controlled to display the assistive guide image in consideration of the object touch information.

According to some aspects, further comprising a vehicle display disposed inside or outside the vehicle, wherein the vehicle display includes a rear display disposed at least at the rear of the vehicle.

According to some aspects, the processor is configured to display, on the vehicle display, at least one of information related to an operation state of the vehicle, traffic state information of a road on which the vehicle is driven, and signal information of a road on which the vehicle is driven.

According to some aspects, the processor is configured to further generate rear vehicle guide information related to a vehicle that travels from the rear of the vehicle, and wherein the processor is configured to further display the rear vehicle guide information on the rear display.

According to some aspects, the processor is configured to: identify at least one object that intends to get on or get off the vehicle, generate movement line information that corresponds to the identified object, and generate a movement line image that corresponds to the movement line information, and wherein the projector is configured to further provide the movement line image.

According to some aspects, the vehicle is a vehicle in which a driving mode can be switched between an autonomous driving mode and a manual driving mode, wherein the processor is configured to display current driving mode information of the vehicle on the vehicle display, and wherein the processor is configured to further display, on the vehicle display, autonomous driving level information of the autonomous driving mode together with the current driving mode information in case that the vehicle is in the autonomous driving mode.

According to some aspects of the disclosure, a vehicle safety support system comprises, a vehicle, a projector disposed on the vehicle, a sensor configured to generate object identification information by identifying at least one object located around the vehicle and to generate object location information that corresponds to a location of the identified object; and a processor configured to generate a guide image in consideration of the object identification information, wherein the projector is configured to project the guide image on a bottom surface on which the at least one object is located in response to the object location information, wherein the sensor is configured to generate object movement information by determining whether the object moves, wherein the projector is configured to adjust a projection location of the guide image so that the guide image tracks the object in accordance with the object movement information, wherein the system further includes an external display disposed in a getting-on/off area of the vehicle, wherein the external display is configured to generate object touch information by recognizing contact with the object, wherein the processor is configured to further generate an assistive guide image in consideration of the object identification information, wherein the external display is configured to be controlled to display the assistive guide image in consideration of the object touch information, wherein the processor is configured to generate the guide image and the assistive guide image based on the object identification information and a template image, and wherein the processor is further configured to provide a user environment in which the template image can be generated or selected.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The vehicle safety support system according to some embodiments of the present disclosure can track and display the location of the object related to the vehicle, thereby assisting objects surrounding the vehicle to recognize the object related to the vehicle. Accordingly, it is possible to support the object related to the vehicle to safely get on and off the vehicle.

Further, the vehicle safety support system according to some embodiments of the present disclosure can support the objects around the vehicle to perform safe passage or safe driving by providing various types of information related to the vehicle through an external display.

In addition to the contents described above, specific effects of the present disclosure will be described together while describing the following specific details for carrying out the present disclosure.

DETAILED DESCRIPTION OF THE PREFERRED EMBODIMENTS

Figure 1:
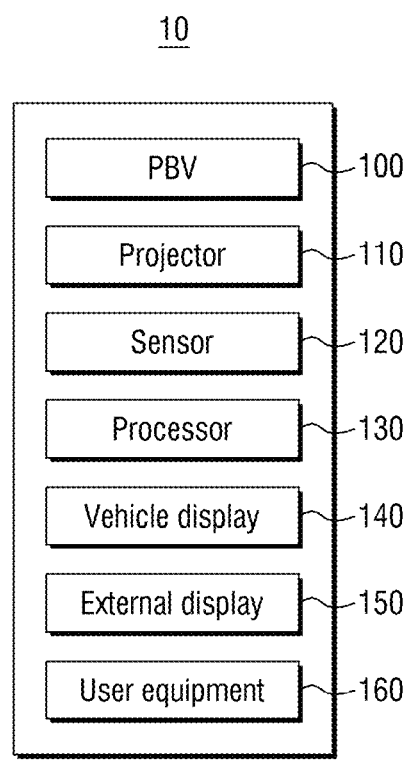
FIG. 1 is a block diagram illustrating the constitution of a vehicle safety support system in accordance with some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, a vehicle safety support system that assists the safety of surrounding objects in accordance with some embodiments of the present disclosure will be described with reference to FIGS. 1 to 10E.

Figure 2A:
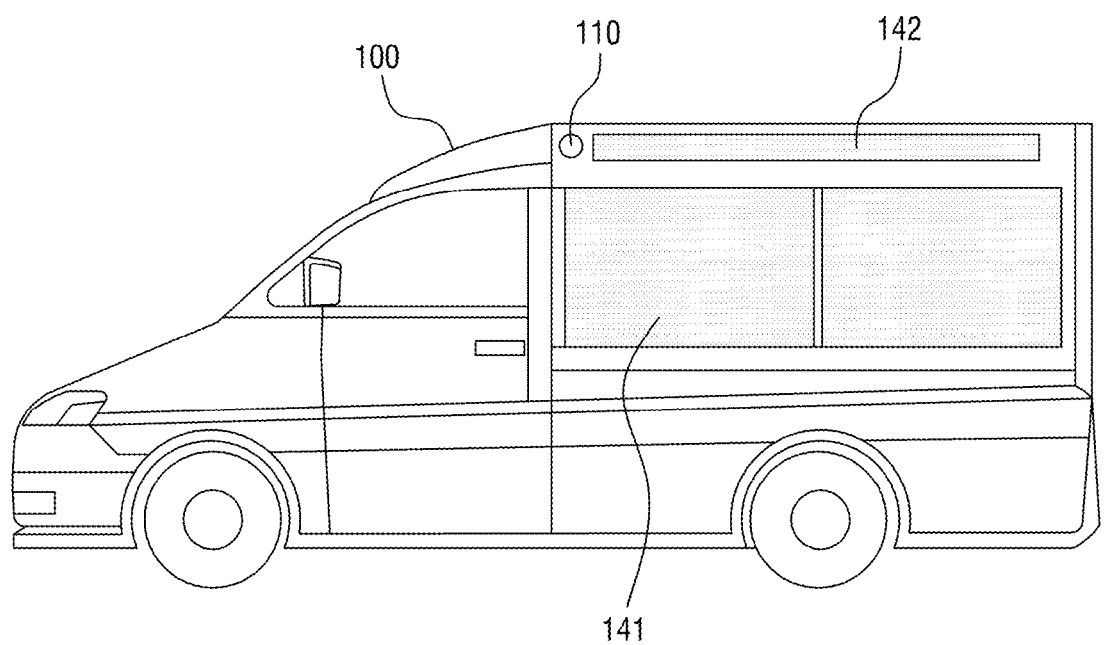
FIGS. 2A and 2B are exemplary diagrams explaining a projector disposed on a vehicle and a vehicle display.
Figure 2B:
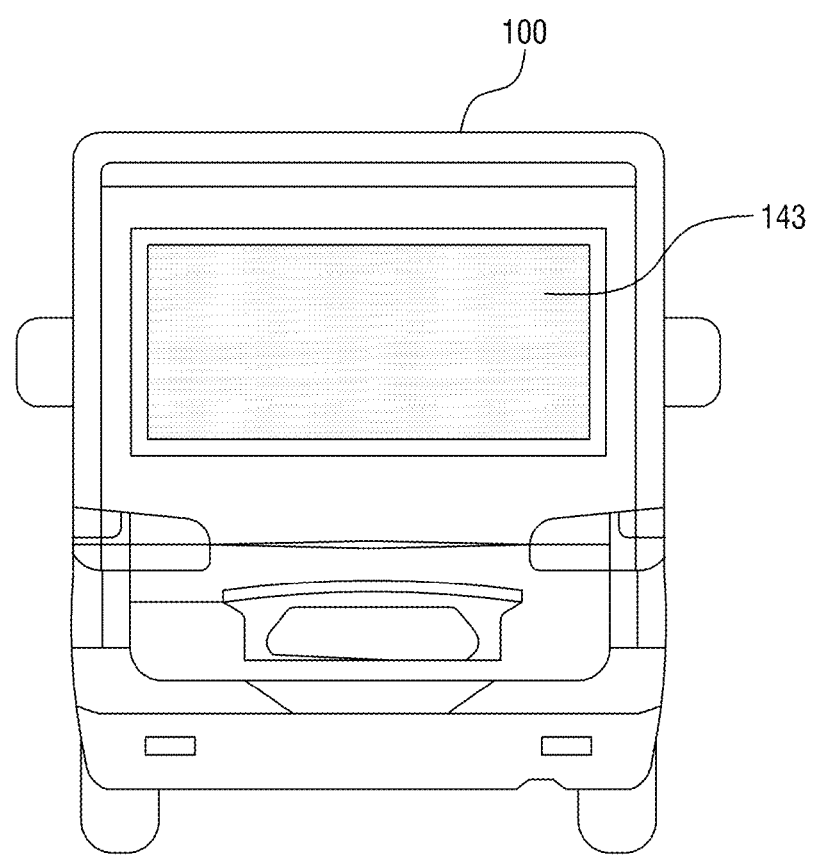
Figure 3A:
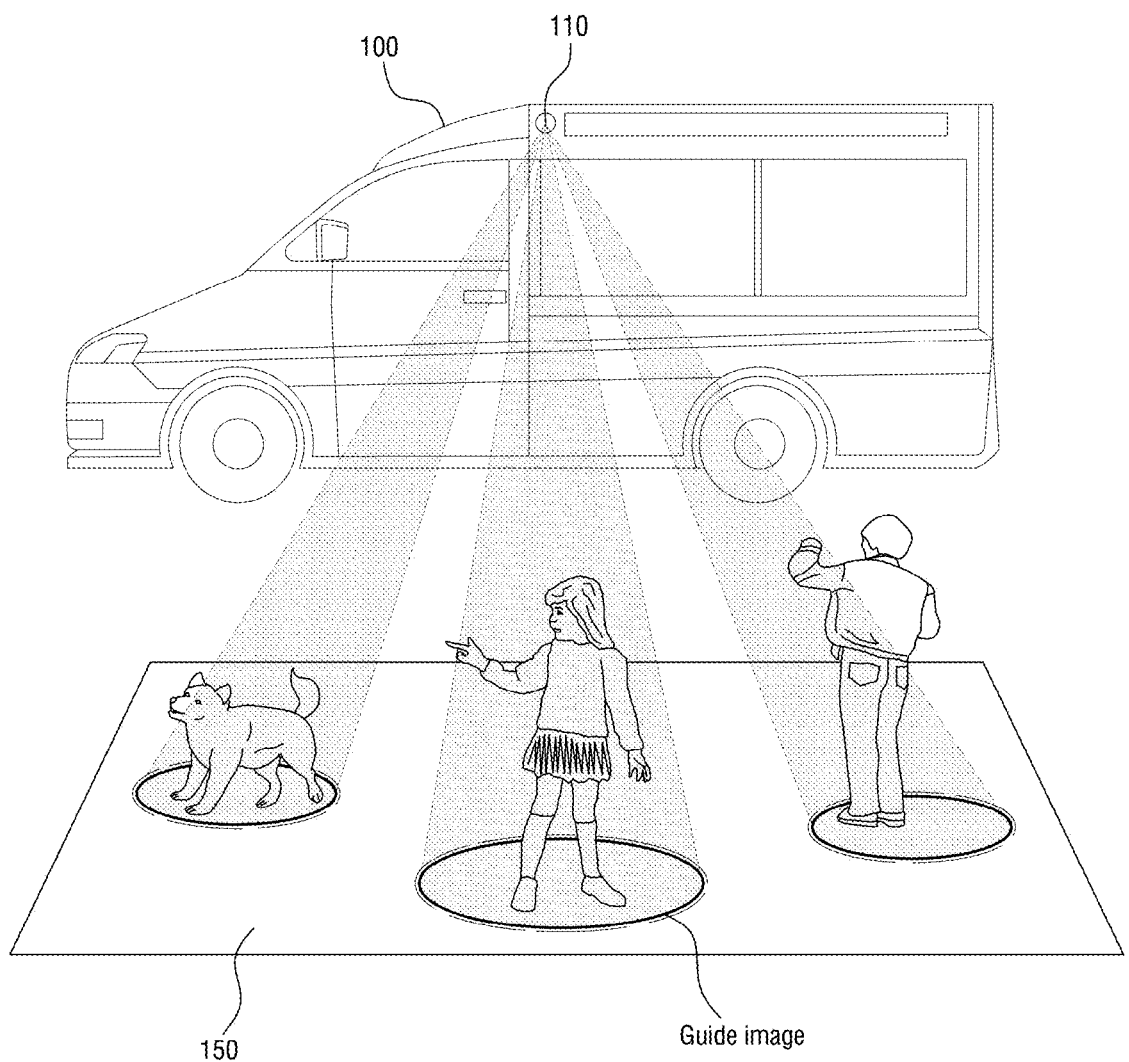
FIGS. 3A and 3B are exemplary diagrams explaining an operating state of a projector disposed on a vehicle.
Figure 3B:
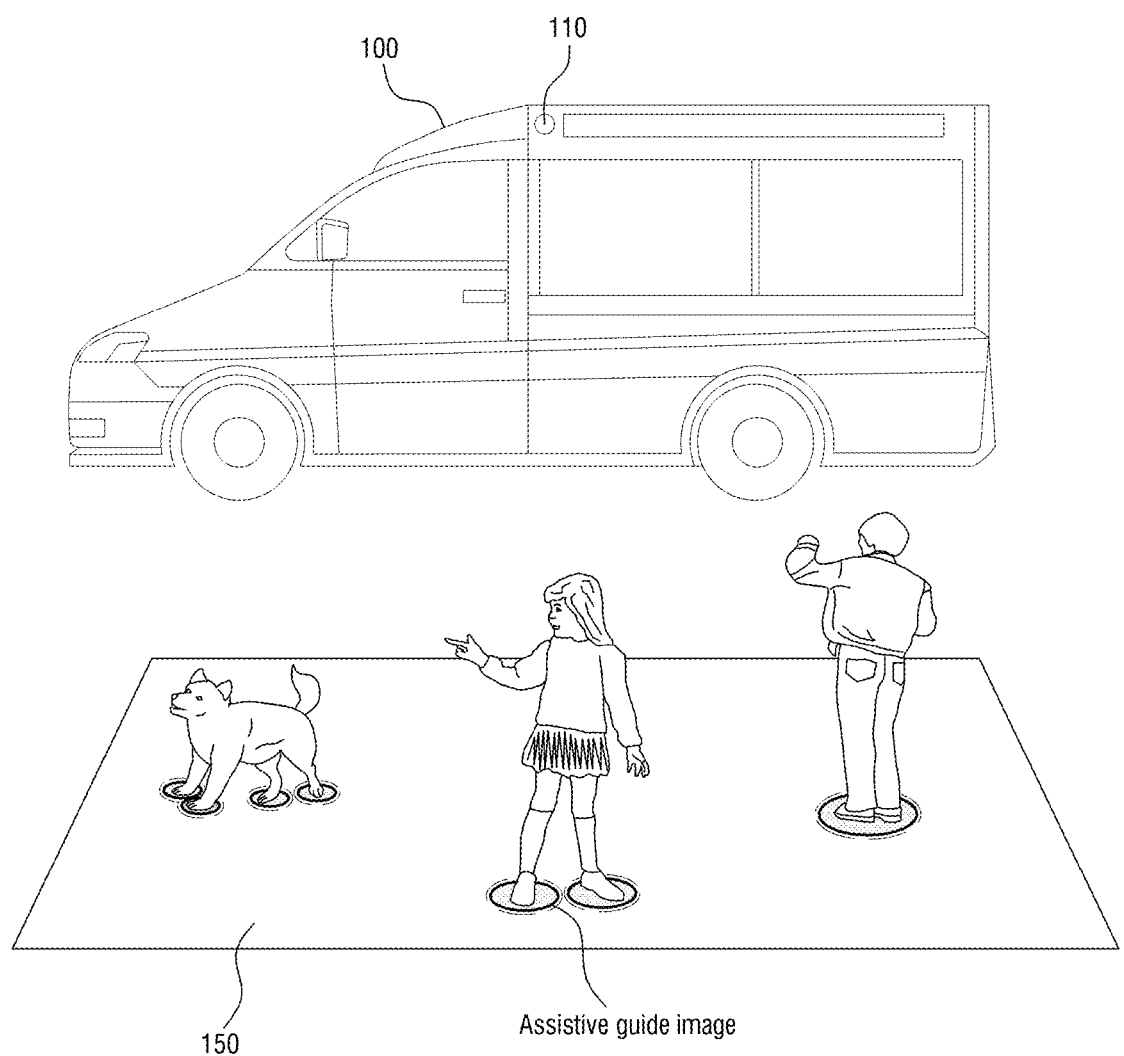

FIG. 1 is a block diagram illustrating the constitution of a vehicle safety support system in accordance with some embodiments of the present disclosure. FIGS. 2A and 2B are exemplary diagrams explaining a projector disposed on a vehicle and a vehicle display. FIGS. 3A and 3B are exemplary diagrams explaining an operating state of a projector disposed on a vehicle.

Referring to FIG. 1, a vehicle safety support system 10 includes a vehicle 100, a projector 110, a sensor 120, a processor 130, a vehicle display 140, and an external display 150.

The vehicle 100 means a purpose built vehicle (PBV) that can provide functions that correspond to user purposes and needs. Further, the vehicle 100 may mean a multiple purpose vehicle (MPV) that can be utilized for various purposes, and may provide various services through the constitution to be described later, or may be flexibly changed for being used for various purposes.

In the present embodiment, in order for the vehicle 100 to provide services to fit for various purposes together with the driving function that is the basic function of the vehicle, the internal constitution of the vehicle 100 may be changed freely. In the indoor space (cabin) of the vehicle 100, various constitutions (seats, storage devices, and electronic devices) may be disposed, and such constitutions may be provided differently in accordance with the services.

The sensor 120 may be a sensing device for an operation of the vehicle 100. Here, the vehicle 100 may be an autonomous vehicle that operates autonomously. That is, autonomous driving of the vehicle 100 may be performed based on information that is collected through the sensor 120. Further, the sensor 120 may recognize the speed change of the vehicle 100 and the change of main constitutions of the vehicle 100. Further, the sensor 120 may be constituted to include at least one of a vision sensor, a LiDAR sensor, a radar sensor, and an infrared sensor, and may sense and recognize objects in an environment around the vehicle.

The processor 130 may process and generate data required for the driving and operation of the vehicle 100 based on the information collected by the sensor 120. Exemplarily, the processor 130 may generate driving data required for the autonomous driving of the vehicle 100 based on the information collected by the sensor 120. Further, the processor 130 may determine the contents being displayed on the vehicle display 140 and the projector 110 in accordance with the vehicle driving purpose or service contents. Further, the processor 130 may be constituted to display information related to the state of the vehicle 100 on the vehicle display 140 and the projector 110.

The vehicle display 140 may be disposed on the interior, exterior, and outside of the vehicle 100. Exemplarily, the vehicle display 140 may be disposed on at least one of the front side, left side, right side, and rear side of the vehicle 100, and may be configured to output information or content in accordance with their respective locations. Exemplarily, the display disposed on the left side of the vehicle 100 may output information for being provided to a vehicle traveling in the opposite lane or in the left lane, and the display disposed on the right side of the vehicle 100 may output information for a vehicle traveling in the right lane or a pedestrian. Further, the display disposed on the rear side of the vehicle 100 may output information to a following vehicle, and the display disposed on the front side of the vehicle 100 may output information to a vehicle traveling in the opposite lane. In an exemplary embodiment, at least one of the location of the vehicle 100 on which the vehicle display 140 is disposed, the output state of the content, and the contents of the content being displayed along an outer surface of the vehicle 100 may be controlled to be automatically changed. Exemplarily, the display that displays information toward a vehicle on the opposite side may be controlled to output image content rather than a video.

Referring to FIGS. 2A and 2B, a plurality of vehicle displays 140 may be constituted, and may include a first display 141, a second display 142, and a third display 143.

The first display 141 may be a transparent display that corresponds to a side window of the vehicle 100, and the light transparency of the first display 141 may be selectively controlled. That is, the transparent state of the first display 141 and the state where an image is displayed to the outside or inside maybe selectively controlled. The second display 142 may be located on the periphery of a roof of the vehicle 100, and may be configured to display always-on information. Exemplarily, the second display 142 may be a flexible display that can be disposed in accordance with an appearance of the vehicle 100, but is not limited thereto.

Further, the third display 143 may be a rear display that corresponds to a rear window of the vehicle 100. The third display 143 may be a transparent display, but is not limited thereto. As shown in FIG. 2B, the third display 143 may be constituted to correspond to the rear window, and the third display 143 may be controlled to be in a transparent state or an image display state in a selective manner.

The external display 150 may be a display that is disposed in an external area of the vehicle 100. Here, the external area may be a place that is related to getting on/off of an object related to the vehicle 100. Exemplarily, the external area may be a predetermined getting-on/off area in order to support the object to get on the vehicle 100 or to get off the vehicle 100. The external display 150 may be disposed on a bottom surface of the getting-on/off area, and may be controlled to display information related to the location of the object.

The projector 110 may be constituted to emit a specific image toward the outside of the vehicle 100. In an exemplary embodiment, the projector 110 may be disposed on the periphery of the roof of the vehicle 100. Further, in some embodiments, the projector 110 may be constituted so that the disposition height of the projector 110 is changed in accordance with the operation state of the projector 110. As exemplarily illustrated in FIG. 2A, one projector 110 may be constituted, but the embodiment of the present disclosure is not limited thereto. In an embodiment, a plurality of projectors 110 may be constituted. The plurality of projectors 110 may be controlled to configure one image together or to provide different pieces of information by emitting light toward the outside of the vehicle 100.

The vehicle display 140 may display information related to the service that is currently provided by the vehicle 100 or related to the driving purpose of the vehicle 100. However, the display of the information is not limited thereto, and the vehicle display 140 may display information related to the state of the vehicle 100 and the surrounding environment of the vehicle 100.

Further, the specific image that is emitted from the projector 110 may be information related to the service that is currently provided by the vehicle 100 or related to the driving purpose of the vehicle 100. However, the display of the information is not limited thereto, and the specific image may include the information related to the state of the vehicle 100 and the surrounding environment of the vehicle 100. Further, the image that is provided from the projector 110 may be a guide image for protecting and guiding the object related to the vehicle 100.

Referring to FIG. 3A, the vehicle 100 may be in a stationary state. In the stationary state of the vehicle 100, the object boarding the vehicle 100 may get off the vehicle 100. The projector 110 may receive location information of the surrounding object having gotten off the vehicle 100, and may output the guide image GI on the bottom surface on which the object is located in response to the location information.

Here, the object may be in a state where the object intends to get off the vehicle 100 or in a state where the object intends to get on the vehicle 100, and may correspond to a target that needs support with safe getting off and movement due to somewhat insufficient awareness of surrounding things and vigilance ability. Exemplarily, as illustrated in FIG. 3A, the object may be the subject that needs help from the surrounding environment, such as an infant and young child, old or weak person, disabled person, pregnant woman, or pet, but is not limited thereto.

As the guide image is provided onto the bottom surface on which the object is located, it may be easy for surrounding objects (surrounding pedestrians or surrounding vehicles) of the vehicle 100 to identify the object. Further, by the guide image that is displayed on the bottom surface, the object can recognize and identify the external environment more easily, and thus safe movement of the object after the getting off can be supported.

Further, in order to get off or get on the vehicle 100, the object may move through the getting-on/off area, and may come in contact with the external display 150 disposed in the getting-on/off area. The external display 150 may be constituted to display an assistive guide image in response to such contact with the object. The assistive guide image may support the surrounding objects (surrounding pedestrians or surrounding vehicles) of the vehicle 100 to identify the object.

The assistive guide image may be configured to display one piece of information together with the guide image. Exemplarily, the assistive guide image may be configured as a color or an image that can emphasize a protection area of the guide image. In some embodiments, the assistive guide image may be configured to display a color that has a complementary color relationship with the color of the protection area of the assistive guide image, and may support more clear recognition of the protection area. Further, in some embodiments, the assistive guide image may be configured to further display an image that overlaps the protection area of the assistive guide image, and may support more clear recognition of the protection area.

In some embodiments, referring to FIG. 3B, the assistive guide image may be configured to emphasize a part of the external display 150, which comes in contact with the object. That is, object touch information that is generated from the external display 150 is generated as the external display 150 and a part (foot) of the body of the object come in contact with each other. The assistive guide image may be configured to emphasize a part where contact actually occurs, rather than an image that emphasizes the object as a whole.

Further, the vehicle display 140 that is disposed outside the vehicle may output information that can support the safety of the surrounding object (surrounding vehicle or surrounding pedestrian) of the vehicle 100, and may support the safe use of the vehicle 100 by the object in relation to safe driving of the vehicle 100.

Here, the constitution and the operation range of the projector 110, the vehicle display 140, or the external display 150 are not limited to the contents as described and illustrated in the related drawings. The related description and the drawings are exemplary, and the main constitutions may be configured to provide various types of information to a greater extent in accordance with the disposition change, specification change, or technology development of the constitutions. Further, the projector 110, the vehicle display 140, or the external display 150 may be configured to operate in response to the external environment. Exemplarily, the projector 110, the vehicle display 140, or the external display 150 may be configured to express related information more accurately through automatic adjustment of brightness in accordance with the illuminance.

Further, the projector 110 may be constituted to firmly operate even with vehicle vibration or the like, and to accurately express the focus and expression on the corresponding surface through automatic grasping of the location recognition down to the ground in case that an image being projected by the projector is not properly expressed due to the difference in height from the bottom surface in accordance with the state of tires of the vehicle.

Further, the projector 110 may be constituted to adjust the viewing angle of projection lenses so that the scope covering a wider bottom surface can be adjusted.

In some embodiments, the sensor 120 may be constituted to be able to identify a relatively dark area as compared with other areas through recognition of the surroundings of the vehicle 100, and the projector 110 may be constituted to output an image onto the identified dark area. Exemplarily, when parking the vehicle, the projector 110 may be used to output an image onto a dark area so that the image can be well recorded in the black box, or may be used for the purpose of anti-thief through alarm warning to criminals. Further, even while night driving of a truck or a vehicle, the projector 110 can enable the location of the truck to be easily grasped, and can support accident risk prevention.

Hereinafter, the vehicle safety support system 10 according to some embodiments of the present disclosure will be described in more detail.

The vehicle safety support system 10 according to some embodiments of the present disclosure may support safe getting-off of an object boarding the vehicle.

Figure 4:
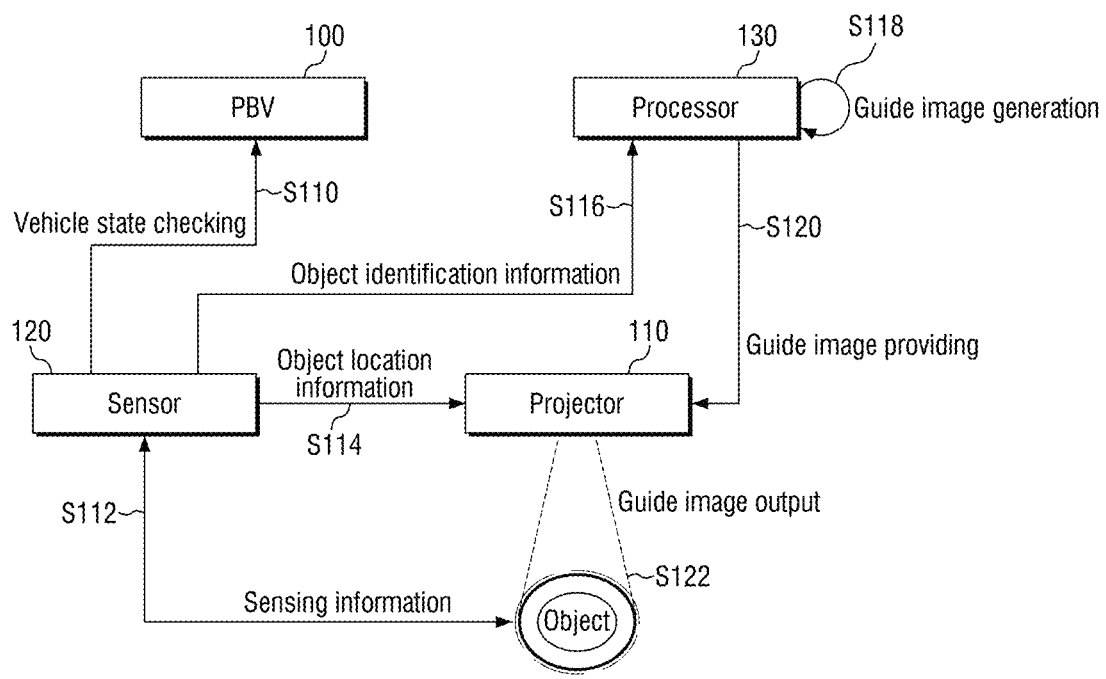
FIG. 4 is a flowchart explaining a process in which a projector outputs a guide image in response to a surrounding object of a vehicle.
Figure 5:
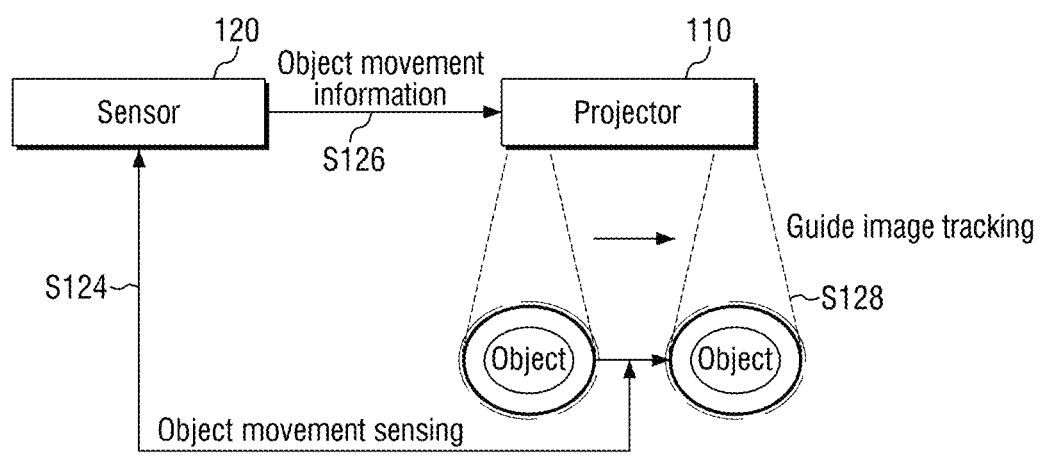
FIG. 5 is a flowchart explaining a process in which a projector outputs a guide image by tracking an object in response to the movement of the surrounding object of a vehicle.
Figure 6:
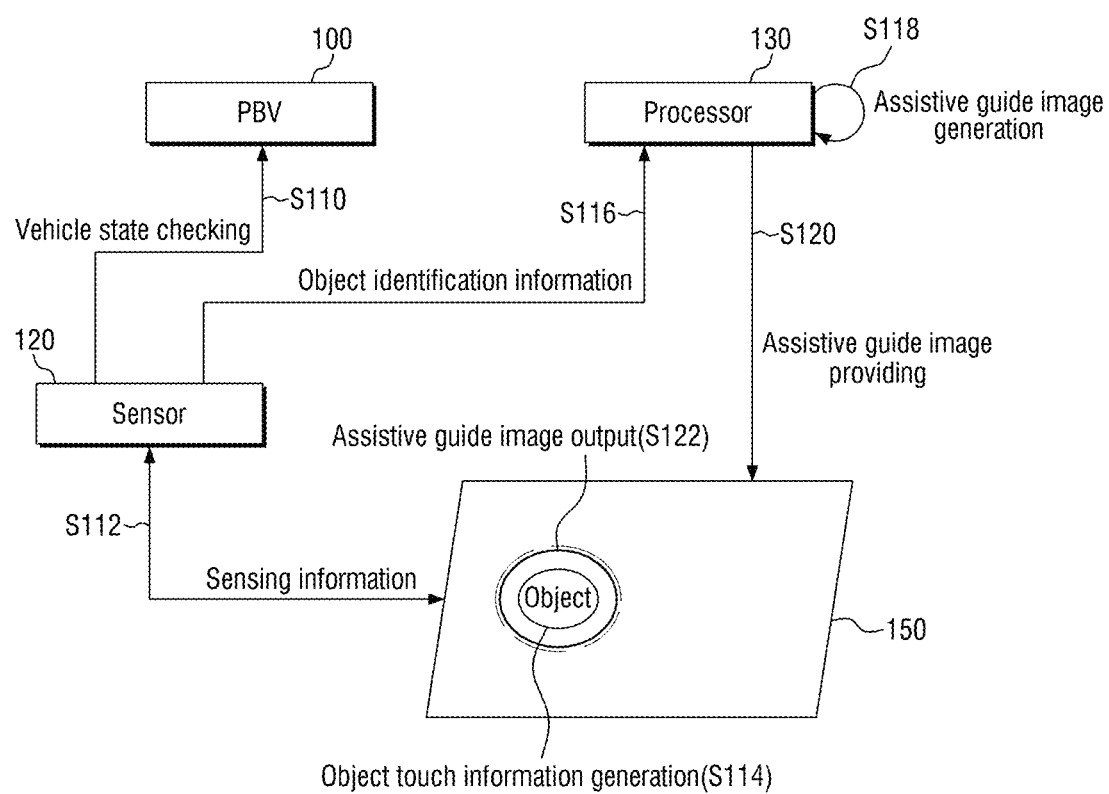
FIG. 6 is a flowchart explaining a process in which an external display outputs an assistive guide image in response to a surrounding object of a vehicle.
Figure 7:
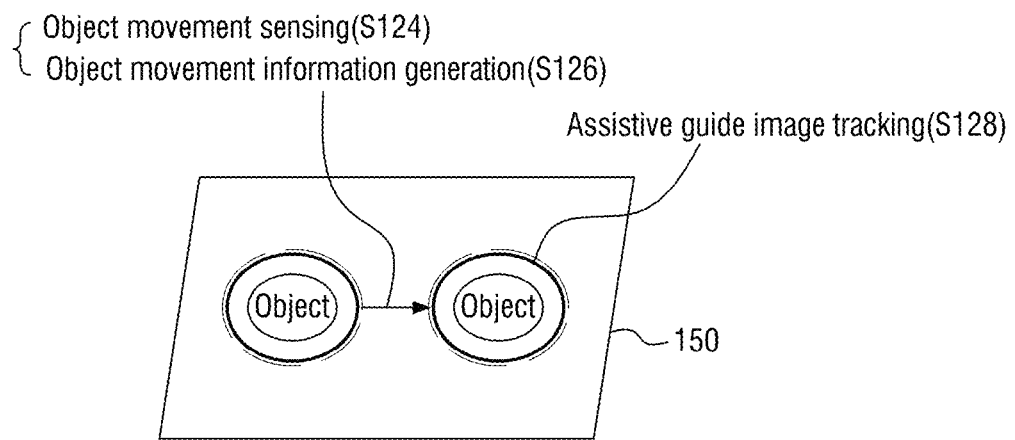
FIG. 7 is a flowchart explaining a process in which an external display outputs an assistive guide image by tracking an object in response to the movement of the surrounding object of a vehicle.
Figure 8:
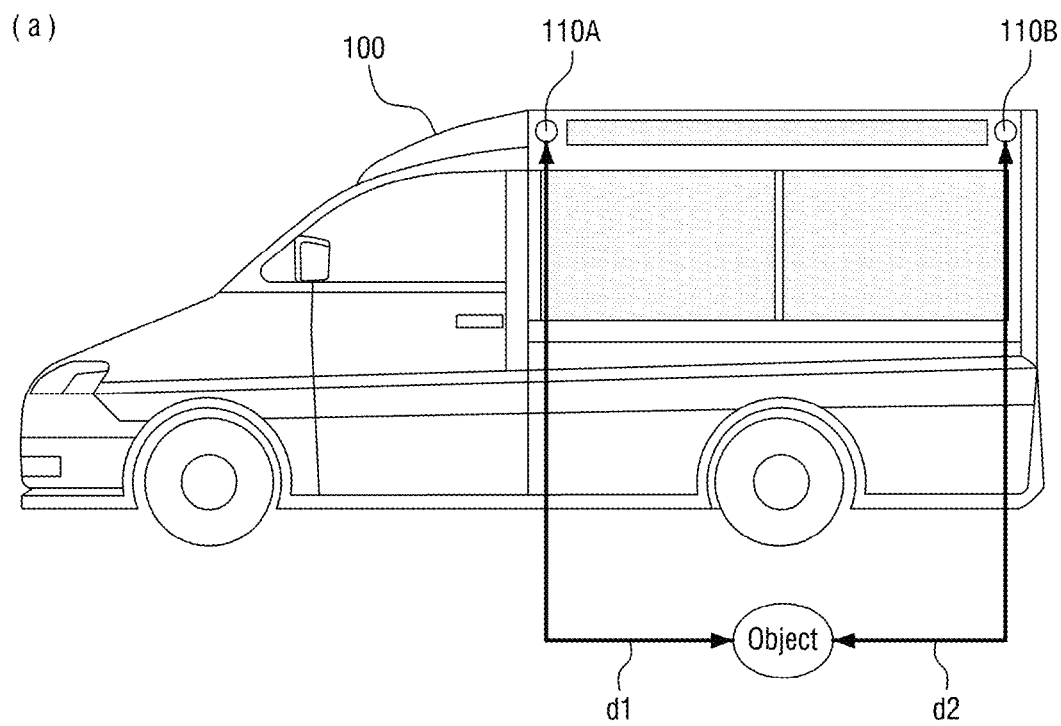
FIG. 8 is an exemplary diagram explaining a process of selectively executing first and second projectors.
Figure 8:
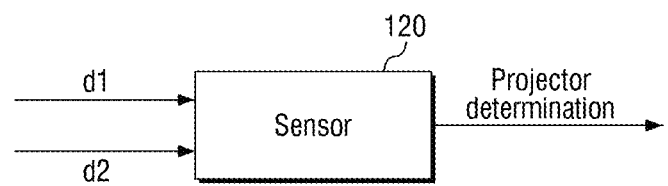
Figure 9:
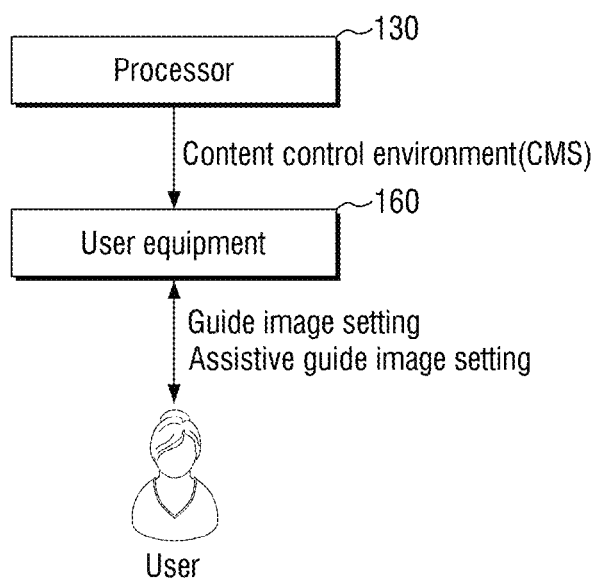
FIG. 9 is an exemplary diagram explaining a process of setting a guide image and an assistive guide image through user equipment.

FIG. 4 is a flowchart explaining a process in which a projector outputs a guide image in response to a surrounding object of a vehicle. FIG. 5 is a flowchart explaining a process in which a projector outputs a guide image by tracking an object in response to the movement of the surrounding object of a vehicle. FIG. 6 is a flowchart explaining a process in which an external display outputs an assistive guide image in response to a surrounding object of a vehicle. FIG. 7 is a flowchart explaining a process in which an external display outputs an assistive guide image by tracking an object in response to the movement of the surrounding object of a vehicle. FIG. 8 is an exemplary diagram explaining a process of selectively executing first and second projectors. FIG. 9 is an exemplary diagram explaining a process of setting a guide image and an assistive guide image through user equipment. FIGS. 10A to 10E are exemplary diagrams illustrating a state where information related to a vehicle is outputted to a vehicle display.

Referring to FIG. 4, the sensor 120 first checks the state of the vehicle (S110). Here, the sensor 120 may activate a function of generating object identification information in response to the state change of the vehicle 100.

In step S110, the sensor 120 may first check that the state of the vehicle 100 is changed from a driving state to a stationary state. Further, after recognizing the stationary state of the vehicle 100, the sensor 120 may recognize whether a door of the vehicle 100 is open. In case the sensor 120 recognizes that the vehicle 100 stops, and door is opened within a predetermined reference time, the sensor 120 may determine that the vehicle is in a getting-off support mode. That is, the sensor 120 may activate a function of generating the object identification information for identifying the object intending to get off the vehicle 100, and may switch to an object sensing state for sensing the object located around the door.

In step S112, the sensor 120 may output a sensing signal toward the door of the vehicle 100 in response to the stationary state and the door opening. At least one object may be in a state where the object intends to move from the inside of the vehicle 100 to the outside of the vehicle 100 through the open door. The sensor 120 may sense the at least one object through the sensing signal.

In the step S112, the sensor 120 may generate object location information through analysis of the location of the object based on the sensing signal. In some embodiments, the sensor 120 may include a radar or a LiDAR. The sensor 120 may generate location information of the object by measuring an elapsed time or frequency deviation of a reflected signal where the sensing signal outputted through the radar or the LiDAR is reflected from the object and returned.

In the step S112, the sensor 120 may generate the object identification information through identification of the object based on the sensing signal. The sensor 120 may further include a vision sensor. The sensor 120 may generate an image through image capturing of the object based on the signal where the sensing signal outputted through the vision sensor is reflected from the object and returned. The sensor 120 may include an object analysis model that identifies the type and the size of the object by analyzing the image.

Here, an object analysis model may be a deep learning based image analysis model, and may be in a pre-learned state so as to generate the object identification information by identifying the type and the size of the object included in the image. In some embodiments, the object analysis model may be implemented by applying Yolo V5 (You Look Once version 5). Here, the type of the object that is identified by the object analysis model may be any one of a child, a pet, old person, disabled person, and pregnant woman, but is not limited thereto. The sensor 120 may generate the object identification information including type information of the object and size information of the object determined by using the object analysis model.

In step S114, the sensor 120 may provide the object location information to the projector 110. In the step to be described later, the projector 110 outputs the provided guide image onto the location in accordance with the object location information. Further, in step S116, the sensor 120 may provide the object identification information to the processor 130.

The processor 130 may generate the guide image in response to the object identification information (S118). Here, the guide image may be an image for protecting the object from the outside. The processor 130 may define a protection area of the object in accordance with the size information of the object. Exemplarily, the protection area of the object may be defined in accordance with the size information of the object. Exemplarily, the protection area of the object may be defined in proportion to the size information of the object. Further, the protection area of the object may be circular, but the shape of the protection area is not limited thereto. The guide image may be configured to emphasize the border of the protection area of the object. That is, as the border of the protection area is emphasized, it may be easy to recognize the object from the outside, and thus protection of the object from the outside may be supported. Further, the guide image may be an image in which the border of the protection area is emphasized, and the inside and the outside of the protection area may be in a transparent state where the contents are not included. That is, the guide image may be in a ring shape in which the border of the protection area is emphasized, but is not limited thereto.

In some embodiments, the processor 130 may determine the type of the object in accordance with the object identification information, and may generate the guide image differently in accordance with the type of the object. Specifically, the processor 130 may configure the shape of the border of the protection area or the color of the border of the protection area differently in accordance with the type of the object.

In some embodiments, the processor 130 may configure the design of the guide image differently in accordance with the type of the object. Further, the processor 130 may configure the guide image so as to display safety warning more accurately by reflecting the characteristic of the object therein. For example, the guide image may be configured to further display the type of the object, and may support further increasing of external attention to the object.

The processor 130 may provide the generated guide image to the projector 110 (S120). The projector 110 may project the provided guide image onto the object in consideration of the object location information (S122).

Specifically, the projector 110 may project the guide image onto the bottom surface on which the object is located in response to the object location information. Here, the guide image that is projected by the projector 110 is provided so that the object is recognized from the outside. Further, if the guide image is directly projected toward the object, it may rather become an obstacle that interferes with the safety of the object. Accordingly, the guide image is not directly projected toward the object, but is projected toward the bottom surface on which the object is located so that the place where the object is located can be emphasized. As the projector 110 projects the guide image, the protection area that corresponds to the appearance of the object may be displayed on the bottom surface on which the object is located.

The vehicle safety support system 10 according to an embodiment of the present disclosure is not limited to the output of the guide image simply onto the bottom surface, but can control the output of the guide image so that the guide image tracks the object in response to the movement of the object.

Even after the object is once identified, the object sensing state of the sensor 120 may be continuously maintained. That is, the sensor 120 may maintain the state of outputting the sensing signal for continuously sensing the object. That is, the sensor 120 may output the sensing signal for sensing the object in real time or in near real time, and may grasp the location change of the object in real time or in near real time. Exemplarily, in accordance with the location change (movement) of the object, the elapsed time or the frequency deviation of the reflected signal that is received by the sensor 120 may be changed, and the sensor 120 may continuously sense such a change.

Referring to FIG. 5, the sensor 120 may sense the change and the movement of the object (S124), and may generate the object movement information and may provide the generated object movement information to the projector 110 (S126). The projector 110 may change the location where the guide image is projected based on the object movement information (S128).

The projector 110 may provide the guide image by tracking the object so that the guide image is continuously located on the bottom surface on which the object is located. That is, since the guide image is continuously provided to correspond to the object even if the object moves, it may be continuously supported that an external object (person or vehicle) recognizes the location and the existence of the object, and it may be continuously supported that the object moves safely even after the object gets off the vehicle 100.

Here, the sensor 120 may define the sensing area that is defined as a specific distance from the vehicle 100. In some embodiments, the sensing area may be a getting-on/off area in which the external display 150 is disposed, but is not limited thereto. That is, the sensor 120 may sense the existence of the object and the movement of the object within the sensing area. In case that the object gets apart more than a certain distance from the vehicle 100, the object may be in a state where the object deviates from the sensing area of the sensor 120. In case that the object does not exist within the sensing area, the sensor 120 may generate object secession information, and may control the projector 110 not to output the guide image any more by transferring the object secession information to the projector 110.

Further, in some embodiments, the sensor 120 may sense the state of the vehicle 100 that is changed from the stationary state to the driving state, may generate the object secession information in response to the state change of the vehicle 100 to the driving state, and may transfer the object secession information to the projector 110. That is, in response to the movement of the vehicle 100, the projector 110 may be controlled not to output the guide image any more.

Referring to FIG. 6, the area where the vehicle 100 stops may be the getting-on/off area where the external display 150 is disposed on the bottom surface. As the object that gets off the vehicle 100 moves through the getting-on/off area, the external display 150 may recognize the contact with the object. The external display 150 may be controlled to display the assistive guide image on the area where the contact is recognized. The step S114 may include generating object touch information by recognizing the contact with the object. The external display 150 may include a display panel including a plurality of pixels and a touch panel disposed on an upper part of the display panel. The touch panel may include a plurality of touch points, and the plurality of touch points and the plurality of pixels may have a correspondence relationship with each other. The touch panel may determine whether to contact the object by recognizing the pressure or the weight in accordance with the touch with the object. The external display 150 may generate the object touch information by identifying at least one touch point where the contact with the object occurs. The assistive guide image can be outputted to the touch pixel and surrounding pixels of the touch pixel based on the touch pixel that corresponds to the touch point in accordance with the object touch information.

In some embodiments, the assistive guide image may be configured to display one piece of information together with the guide image. Exemplarily, the assistive guide image may be configured as a color or an image that can emphasize the protection area of the guide image. In some embodiments, the assistive guide image may be configured to display a color that has a complementary color relationship with the color of the protection area of the assistive guide image, and may support more clear recognition of the protection area. Further, in some embodiments, the assistive guide image may be configured to further display an image that overlaps the protection area of the assistive guide image, and may support more clear recognition of the protection area.

In some embodiments, the assistive guide image may be configured to emphasize the touch point. That is, the object touch information that is generated from the external display 150 is generated as the external display 150 and a part (foot) of the body of the object come in contact with each other. The assistive guide image may be configured to emphasize a part where the contact actually occurs, rather than an image that emphasizes the object as a whole.

The processor 130 may further generate the assistive guide image that corresponds to the guide image in consideration of the object identification information (S118), and may provide the generated assistive guide image to the external display 150 (S120). The external display 150 makes the assistive guide image be recognized by the external objects together with the guide image by displaying the assistive guide image provided from the processor 130 on the area where the contact is recognized (S122).

Referring to FIG. 7, the external display 150 may sense the movement and the change of the object (S124), and may generate the object movement information (S126). The external display 150 tracks the change of the location where the assistive guide image is displayed, and the movement and the change of the object based on the object movement information (S128).

The vehicle safety support system 10 according to some embodiments of the present disclosure may support safe getting-on of the object that intends to get on the vehicle.

In case that the vehicle 100 stops, and a predetermined reference time elapses in a state where the door is not open, the sensor 120 may determine that the vehicle 100 is in a getting-on support mode. That is, the sensor 120 may activate the function of generating the object identification information for identifying the object that intends to get on the vehicle 100. That is, the sensor 120 may be switched to an object sensing state for sensing the object that approaches the sensing area.

The sensor 120 may output the sensing signal to the sensing area. The object may enter the sensing area in order to get on the vehicle 100. The sensor 120 may sense at least one object through the sensing signal, and may generate the object location information and the object identification information. The sensor 120 may provide the object location information to the projector 110. The sensor 120 may provide the object identification information to the processor 130. The processor 130 may generate the guide image and the assistive guide image in response to the object identification information.

The processor 130 may provide the guide image to the projector 110, and may provide the assistive guide image to the external display 150. The projector 110 may project the guide image onto the bottom surface of the sensing area where the object is located based on the object location information. Further, the external display 150 may be disposed in the sensing area (getting-on/off area), may identify the touch part with the object, and may output the assistive guide image to the touch part. That is, the guide image and the assistive guide image may be outputted together on the bottom surface of the object that intends to get on the vehicle, and may support the external objects to recognize the object more clearly and easily. The sensor 120 may generate the object movement information in response to the movement of the object, and the external display 150 may change the touch part in response to the movement of the object. The projector 110 changes the projection location of the guide image in accordance with the object movement information, and the external display 150 displays the image by tracking the object through the change of the projection location of the assistive guide image in accordance with the change of the touch part.

In some embodiments, a plurality of objects related to the vehicle 100 may be provided, and the sensor 120 may generate the object identification information and the object location information by identifying the plurality of objects. In case that the first object and the second object are in a getting-off state, the sensor 120 may generate and provide first object identification information and the first object location information corresponding to the first object to the processor 130 and the projector 110, respectively. Further, the external display 150 may generate the first object touch information corresponding to the first object and the second object touch information corresponding to the second object.

Further, the sensor 120 may generate and provide the second object identification information and the second object location information corresponding to the second object to the processor 130 and the projector 110, respectively. The processor 130 may generate the first guide image in response to the first object identification information, and may generate the second guide image in response to the second object identification information. The processor 130 may generate the first assistive guide image in response to the first object identification information, and may generate the second assistive guide image in response to the second object identification information.

The projector 110 may project the first guide image on the bottom surface of the first object based on the first object location information, and may project the second guide image on the bottom surface of the second object based on the second object location information. Further, the sensor 120 may generate the first object movement information in accordance with the movement of the first object and the second object movement information in accordance with the movement of the second object. The projector 110 may track the first object and the second object based on the first object movement information and the second object movement information being provided from the sensor 120. Further, the external display 150 may output the first assistive guide image based on the first object touch information, and may output the second assistive guide image based on the second object touch information.

In some embodiments, the projector 110 may include a first projector 110A and a second projector 110B located on different outsides of the vehicle 100. As exemplified in FIG. 8, the first projector 110A may be located at the top right of the vehicle 100, and the second projector 110B may be located at the top left of the vehicle 100. The first projector 110A and the second projector 110B may selectively operate in accordance with the location of the object.

The sensor 120 may generate the object identification information and the object location information that correspond to at least one object. The sensor 120 may determine first distance information d1 in accordance with the object location information and the disposition location of the first projector 110A and second distance information d2 in accordance with the object location information and the disposition location of the second projector 110B. The sensor 120 may determine the projector that will provide the guide image between the first projector 110A and the second projector 110B in consideration of the first distance information d1 and the second distance information d2. The sensor 120 may select the projector that is located close to the current object between the first projector 110A and the second projector 110B as the projector that will provide the guide image. That is, the sensor 120 may select the projector having a relatively short distance between the first distance information d1 and the second distance information d2.

The sensor 120 may provide the object location information to the selected projector, and may provide projector selection information and the object identification information to the processor 130. The processor 130 may generate the guide image in consideration of the provided object identification information, and may provide the generated guide image to the projector in accordance with the projector selection information.

In some embodiments, the processor 130 may identify at least one object that intends to get on or off the vehicle 100. Exemplarily, a plurality of objects intending to get on or off the vehicle 100 may be provided, and the processor 130 may be configured to identify the plurality of objects. The processor 130 may include an object identification model that identifies the plurality of objects, and may include a movement line generation model that generates movement line information of the identified object. The object identification model may be an artificial intelligence based identification model pre-learned to identify at least one object. Further, the movement line generation model may be an artificial intelligence based identification model pre-learned to generate the movement line information that corresponds to the identified object. The movement line information may be an expected movement path of the object generated based on the past movement line of the corresponding object. That is, the movement line information may mean a movement path for the object generated based on the past movement line to get off the vehicle and to move to the destination or a movement path for the object to get on the vehicle from the outside.

The processor 130 may identify a plurality of objects, may generate movement line information for each of the plurality of objects, and may generate a movement line image in response to the movement line information. The movement line image is to display a movement path in response to the movement line information, and may be provided together with the guide image. That is, as the movement line image is further provided, it is possible to give advance warning to external mobility (general vehicle, motorcycle, and autonomous vehicle), and thus safe vehicle use of the object can be further supported.

In some embodiments, the projector 110 may operate to provide the movement line image in a state where the movement of the object is not sensed or in a state where the movement is not performed for a predetermined time. That is, in the state where the object moves continuously, the guide image may be provided to track the object, and in the state where the movement of the object has stopped for a while, the movement of the object can be supported by providing the movement line image. Exemplarily, in a state where the door of the vehicle 100 is in an open state for getting-off of the object, the movement line image is preferentially provided, and in case that the movement of the object is sensed, the guide image is outputted instead of the movement line image, and in case that the movement of the object is stopped for a predetermined time, the projector 110 may control the output of the image so that the movement line image is provided again. In some embodiments, the movement line image may be provided to the vehicle display 140 as a video or an image. The vehicle display 140 may transfer the information to the object by outputting the movement line image in the form of a video or an image. Since the video is a dynamic image and has more visibility, it may inform the surrounding vehicles to assist the safety of the person who gets off the vehicle more effectively. In some embodiments, the vehicle safety support system 10 may further include user equipment 160. Here, the user equipment 160 may be equipment of a user who uses the vehicle 100, but is not limited thereto. The user equipment 160 may be equipment of a manager who manages the vehicle safety support system 10.

Referring to FIG. 9, the user equipment 160 may be constituted to exchange data with the processor 130 through a network. The processor 130 may provide a user environment to the user equipment 160 so as to be able to change and control the guide image and the assistive guide image. The user environment may be a control management system (CMS) which can control the content that is outputted to at least one of the vehicle display 140, the projector 110, and the external display 150. Through the user environment, the user can set the guide image and the assistive guide image.

In some embodiments, the processor 130 may generate the guide image and the assistive guide image in consideration of a template image set through the user environment and the object identification information. The template image may be a basic image for generating the guide image and the assistive guide image.

The user environment may provide an interface for being able to select one of a plurality of template images and an interface for being able to generate the template image. The user may generate or select the template image through the interface provided by the user environment, and may support generation of the guide image and the assistive guide image through the selected template image.

The vehicle safety support system 10 according to some embodiments of the present disclosure may be configured to display information related to the vehicle through the vehicle display 140.

Figure 10A:
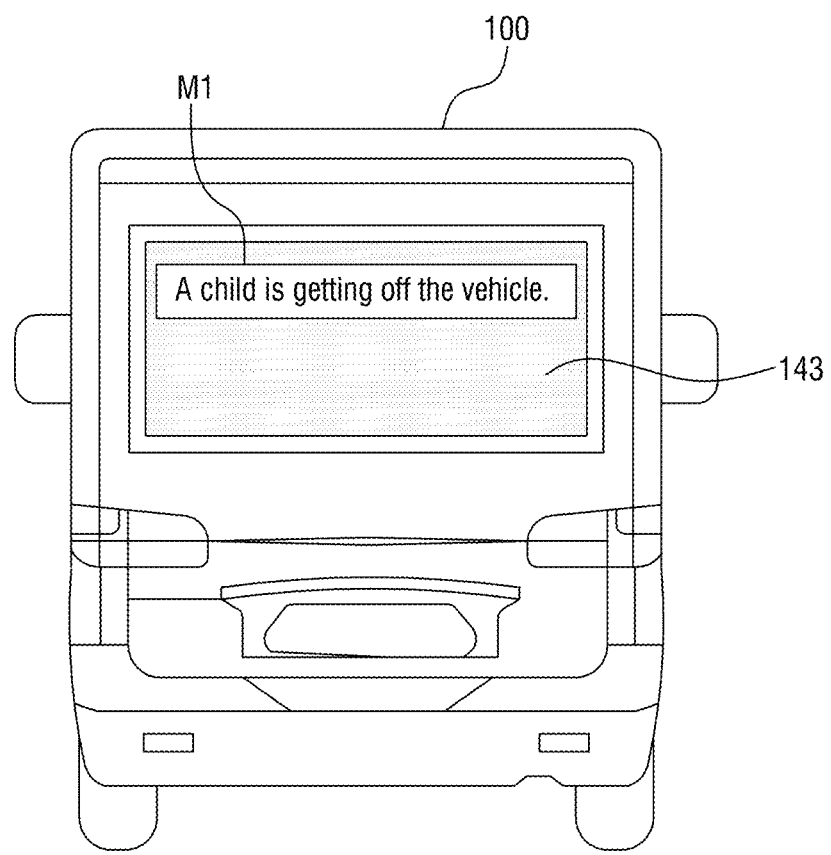
FIGS. 10A to 10E are exemplary diagrams illustrating a state where information related to a vehicle is outputted to a vehicle display.

In some embodiments, the processor 130 may display the object identification information and the object location information on the vehicle display 140. That is, the processor 130 may be constituted to display information related to the movement of the object in accordance with the object identification information and the object location information on the vehicle display. Referring to FIG. 10A, it can be known that information M1 related to the movement of the object, such as "A child is getting off the vehicle", is displayed on the third display 143. As the information related to the movement of the identified object is further displayed on the vehicle display 140, it can be further supported that surrounding objects of the vehicle 100 recognize the object, and thus the safety related to the getting-on/off of the object can be further assured.

In some embodiments, the processor 130 may be constituted to display, on the vehicle display 140, at least one of information related to the operation state of the vehicle, traffic state information of a road on which the vehicle is driven, and signal information of the road on which the vehicle is driven. The processor 130 may output the information on the third display 143 that corresponds to the rear display, but the embodiment of the present disclosure is not limited thereto.

The sensor 120 may be constituted to sense the operation state of the vehicle 100. Here, the operation state may include state information that is changed in accordance with the operation of the vehicle 100, such as the speed of the vehicle 100, temperature, tire air pressure, electric power state, and fuel amount. The processor 130 may be constituted to display the operation state information sensed by the sensor 120 (e.g., current speed of the vehicle, temperature, tire air pressure measurement value, electric power state, and fuel amount) on the vehicle display 140.

Figure 10B:
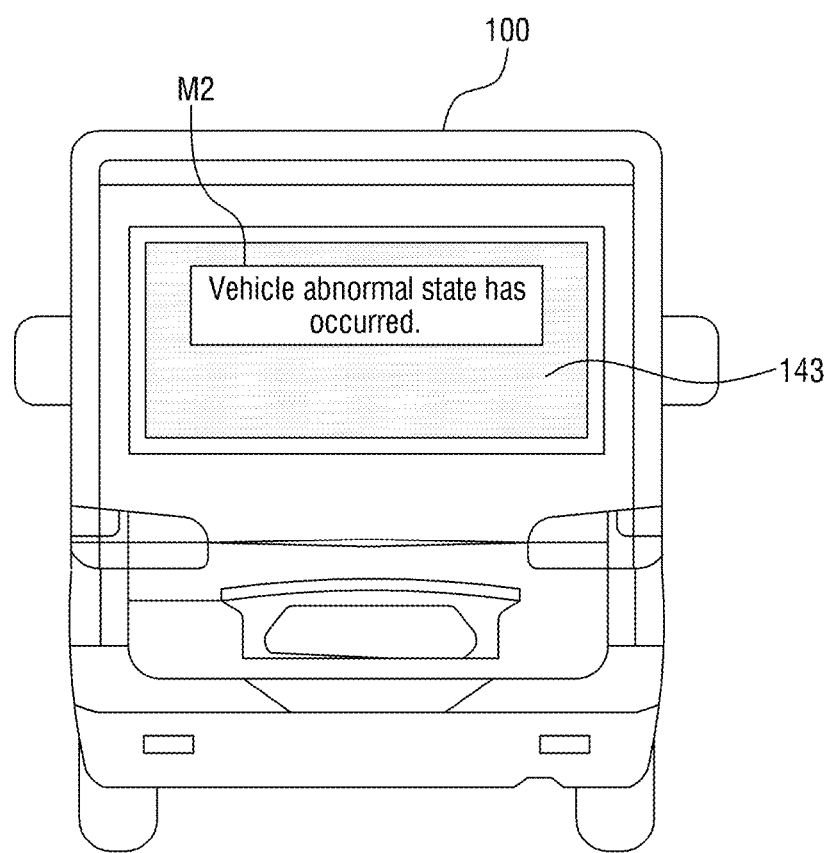

Further, in case that the state information included in the operation state information exceeds a predetermined threshold value, the processor 130 may determine that an abnormal state has occurred. That is, the processor 130 may determine whether an abnormal state of the vehicle 100 has occurred based on the operation state information that is provided from the sensor 120, and if the abnormal state has occurred, the processor 130 may display the occurrence of an emergency situation of the vehicle on the vehicle display 140. Referring to FIG. 10B, it can be known that emergency situation information M2 related to the vehicle, such as "Vehicle abnormal state has occurred", is displayed on the third display 143.

Further, the sensor 120 may be constituted to determine whether a passenger boarding the vehicle 100 is in an abnormal state. That is, the sensor 120 may sense health state information (e.g., body temperature, heart rate, and posture) of the passenger in real time or in near real time. In case that the change of the passenger's health state information being provided from the sensor 120 exceeds a predetermined threshold value, the processor 130 may determine that the abnormal situation of the passenger has occurred. That is, the processor 130 may determine whether the abnormal state of the passenger of the vehicle 100 has occurred based on the health state information of the passenger that is provided by the sensor 120, and if the abnormal state has occurred, the processor 130 may display the occurrence of the emergency situation of the vehicle on the vehicle display 140.

Further, the processor 130 may be further constituted to determine the urgency of the abnormal state information that is outputted on the vehicle display 140. For example, the processor 130 may determine the urgency based on a difference value between the operation state information and the threshold value, and the difference value and the degree of urgency may form a proportional relationship. The processor 130 may configure the color of the information that is displayed on the vehicle display 140 differently in accordance with the determined urgency. For example, the color of the information having high urgency may be red, and the color of the information having relatively low urgency may be purple.

Further, the processor 130 may display information related to the driving state of the vehicle 100 on the vehicle display 140. In some embodiments, the processor 130 may process so that the information related to the driving state of the vehicle 100, such as current vehicle direction (forward or backward), acceleration information, deceleration information, lane change, and change of direction, is displayed on the vehicle display 140.

As the operation state information related to the vehicle 100 is provided through the vehicle display 140, the recognition of the vehicle state can be supported for vehicle surrounding objects related to the vehicle 100. In particular, the surrounding objects can recognize whether the abnormal state of the vehicle 100 has occurred, and thus can be supported in coping and responding appropriately.

In some embodiments, the processor 130 may further control the operation of the vehicle display 140 in response to the abnormal state occurrence and the emergency situation occurrence. Here, the operation control of the vehicle display 140 in response to the abnormal state occurrence may mean the control of any one of displays that constitute the vehicle display 140 to selectively operate. During the abnormal state occurrence, in order to save the power consumption of the vehicle 100 and to increase the efficiency of information transfer, the situation of the abnormal state occurrence may be transferred to the outside by using only one external display.

Figure 10C:
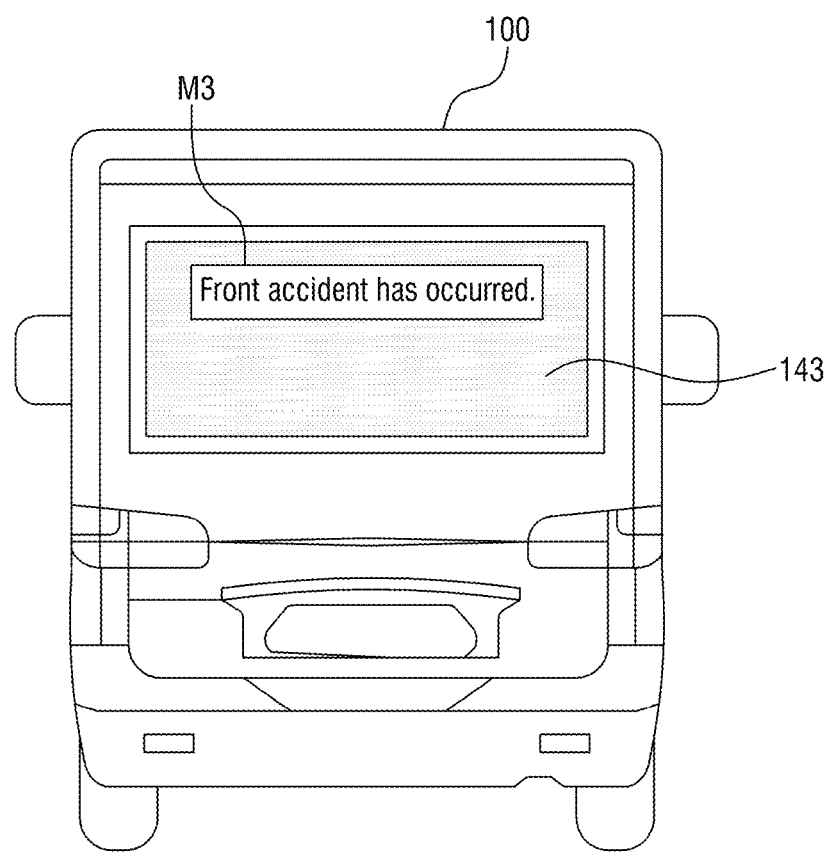

Further, in some embodiments, the sensor 120 may be constituted to obtain information related to an environment in which the vehicle 100 is driven. The sensor 120 may obtain traffic state information of a road on which the vehicle 100 is driven and signal information of the road on which the vehicle 100 is driven. The processor 130 may provide the traffic state information of the road and the signal information of the road which are obtained through the sensor 120 through the vehicle display 140. For example, the processor 130 may provide, through the vehicle display 140, guides for signal information of the road, speed limit information, and traffic state information or the road (accident occurrence, front congestion, and entrance of school zones). Referring to FIG. 10C, it can be known that traffic state information M3, such as "Front accident has occurred", is displayed on the third display 143.

As the traffic state information of the road and the signal information of the road, which are related to the vehicle 100, are provided through the vehicle display 140, the vehicle surrounding objects related to the vehicle 100 can recognize the road information related to the vehicle. Accordingly, the surrounding objects can be supported in coping and responding to the corresponding road situation more appropriately.

Figure 10D:
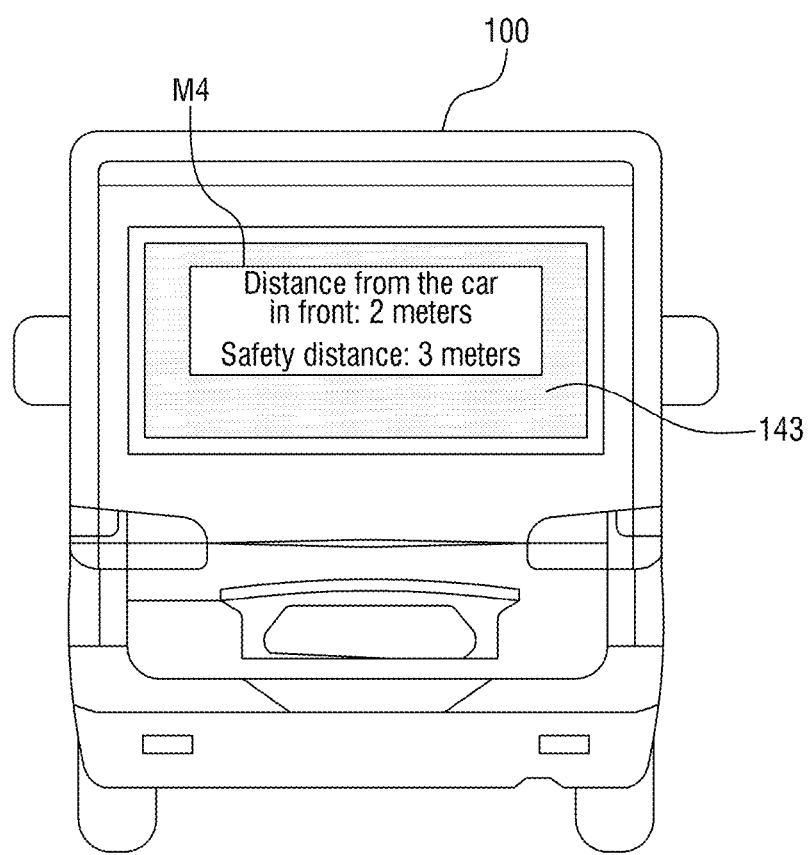

Further, in some embodiments, the sensor 120 may recognize another vehicle that is located at the rear of the vehicle 100. Specifically, the sensor 120 may identify the speed of another vehicle that is located at the rear of the vehicle 100 and the distance from another vehicle. The processor 130 may display the distance information from the rear vehicle and safety distance information on the third display 143, that is, the rear display. Accordingly, the driver of the rear vehicle can maintain the distance from the vehicle 100 in accordance with the distance information that is provided from the third display 143, and can be supported in performing safe driving. Referring to FIG. 10D, it can be known that the distance information from the rear vehicle and the safety distance information M4, such as "Distance from the car in front: 2 meters, Safety distance: 3 meters" on the third display 143. Exemplarily, since the current distance is shorter than the safety distance, the distance from the car in front may be displayed in red color as warning.

Figure 10E:
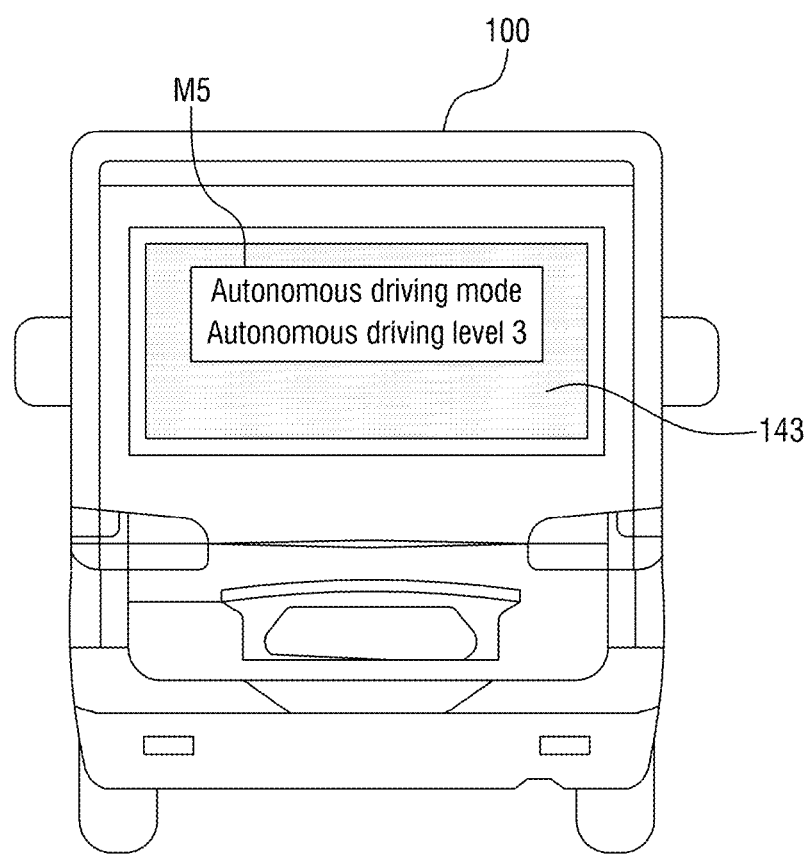

Further, in some embodiments, the vehicle 100 may be a vehicle in which the driving mode can be switched between an autonomous driving mode and a manual driving mode. The processor 130 may display the current driving mode information of the vehicle 100 on the vehicle display 140. Specifically, the processor 130 may display the current driving mode information of the vehicle 100 on the third display 143 that is the rear display, but is not limited thereto. Further, in case that the vehicle 100 is in the autonomous driving mode, the processor 130 may further display the autonomous driving level information of the autonomous driving mode on the vehicle display 140 together with the current driving mode information. Referring to FIG. 10E, it can be known that the distance information from the rear vehicle and the safety distance information M4, such as "Autonomous driving mode, Autonomous driving level 3", is displayed on the third display 143. Exemplarily, since the current distance is shorter than the safety distance, the distance from the car in front may be displayed in red color as warning.

Accordingly, the vehicle surrounding objects can check the current driving mode and the autonomous driving level information of the vehicle 100, and thus can be supported in coping and responding to the driving mode of the vehicle 100 more appropriately.

In some embodiments, the illuminance or luminance of the display that is outputted in accordance with the external illuminance can be automatically adjusted so that information that is provided through the vehicle display 140, in particular, information that is displayed on the display disposed outside the vehicle, such as the first, second, and third displays 141, 142, and 143 does not exert an influence on the traffics and driving of the vehicle surrounding objects.

The vehicle safety support system according to some embodiments of the present disclosure can assist objects around the vehicle to recognize the object by tracking and displaying the location of the object related to the vehicle. Accordingly, it is possible to support the object related to the vehicle to safely get on and off the vehicle.

Further, the vehicle safety support system according to some embodiments of the present disclosure can support objects around the vehicle to perform safe passage or safe driving by providing various types of information related to the vehicle through the external display.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A vehicle safety support system comprising:
a vehicle;
a projector disposed on the vehicle;
a sensor configured to generate object identification information by identifying at least one object located around the vehicle and to generate object location information that corresponds to a location of the identified object;
a processor configured to generate a guide image in consideration of the object identification information;
an external display disposed in a getting-on/off area of the vehicle;
wherein the projector is configured to project the guide image on a bottom surface on which the at least one object is located in response to the object location information,
wherein the sensor is configured to continuously maintain an object sensing state even after the object is once identified,
wherein the sensor is configured to generate object movement information by determining whether the object moves in real time,
wherein the projector is configured to make the guide image be continuously located on the bottom surface on which the object is located by adjusting a projection location of the guide image so that the guide image tracks the object in accordance with the object movement information,
and wherein the external display is configured to generate object touch information by recognizing contact with the object,
wherein the processor is configured to further generate an assistive guide image in consideration of the object identification information, and
wherein the external display is configured to be controlled to display the assistive guide image in consideration of the object touch information.

2. The system of claim 1, wherein the object identification information comprises size information of the identified object, and
wherein the processor is configured to define a protection area of the object in accordance with the size information of the object and to generate the guide image so that a border of the protection area is changed in shape or color.

3. The system of claim 1, wherein the at least one object is in a state of getting off the vehicle, and
wherein the sensor is configured to generate the object location information and the object identification information by identifying the object that gets off the vehicle and to be activated in response to opening of a door of the vehicle.

4. The system of claim 1, further comprising a vehicle display disposed inside or outside the vehicle,
wherein the vehicle display includes a rear display disposed at least at the rear of the vehicle.

5. The system of claim 4, wherein the processor is configured to display, on the vehicle display, at least one of information related to an operation state of the vehicle, traffic state information of a road on which the vehicle is driven, and signal information of a road on which the vehicle is driven.

6. The system of claim 4, wherein the processor is configured to further generate rear vehicle guide information related to a vehicle that travels from the rear of the vehicle, and
wherein the processor is configured to further display the rear vehicle guide information on the rear display.

7. The system of claim 1, wherein the processor is configured to: identify at least one object that intends to get on or get off the vehicle, generate movement line information that corresponds to the identified object, and generate a movement line image that corresponds to the movement line information, and
wherein the projector is configured to further provide the movement line image.

8. The system of claim 4, wherein the vehicle is a vehicle in which a driving mode can be switched between an autonomous driving mode and a manual driving mode,
wherein the processor is configured to display current driving mode information of the vehicle on the vehicle display, and
wherein the processor is configured to further display, on the vehicle display, autonomous driving level information of the autonomous driving mode together with the current driving mode information in case that the vehicle is in the autonomous driving mode.

9. A vehicle safety support system comprising:
a vehicle;
a projector disposed on the vehicle;
a sensor configured to generate object identification information by identifying at least one object located around the vehicle and to generate object location information that corresponds to a location of the identified object; and
a processor configured to generate a guide image in consideration of the object identification information,
wherein the projector is configured to project the guide image on a bottom surface on which the at least one object is located in response to the object location information,
wherein the sensor is configured to generate object movement information by determining whether the object moves,
wherein the projector is configured to adjust a projection location of the guide image so that the guide image tracks the object in accordance with the object movement information,
wherein the system further includes an external display disposed in a getting-on/off area of the vehicle,
wherein the external display is configured to generate object touch information by recognizing contact with the object,
wherein the processor is configured to further generate an assistive guide image in consideration of the object identification information,
wherein the external display is configured to be controlled to display the assistive guide image in consideration of the object touch information,
wherein the processor is configured to generate the guide image and the assistive guide image based on the object identification information and a template image, and
wherein the processor is further configured to provide a user environment in which the template image can be generated or selected.

* * * * *